(No Model.)

J. W. CROW.
FRUIT TREE AND PLANT COVER.

No. 343,533. Patented June 8, 1886.

WITNESSES
B. C. Trunck
G. S. Cooper

INVENTOR
Jacob Walter Crow
By his Atty.
John S. Duffie
Attorney

UNITED STATES PATENT OFFICE.

JACOB WALTER CROW, OF ARKADELPHIA, ARKANSAS, ASSIGNOR OF ONE-HALF TO AUSTIN M. CROW, OF SAME PLACE.

FRUIT-TREE AND PLANT COVER.

SPECIFICATION forming part of Letters Patent No. 343,533, dated June 8, 1886.

Application filed February 9, 1886. Serial No. 191,329. (No model.)

*To all whom it may concern:*

Be it known that I, JACOB WALTER CROW, a citizen of the United States, residing at Arkadelphia, in the county of Clark and State of Arkansas, have invented certain new and useful Improvements in Tree and Plant Covers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is designed to protect fruits, flowers, &c., liable to be killed by cold and early frosts, and from all flies and other damaging prey in the early budding, blooming, and fruiting processes. It is also designed to protect trees and plants from being injured or destroyed by cold or insects.

Figure 1:
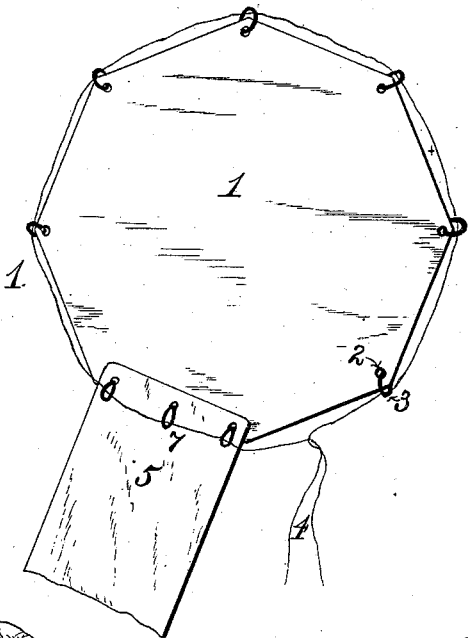
Figure 3:
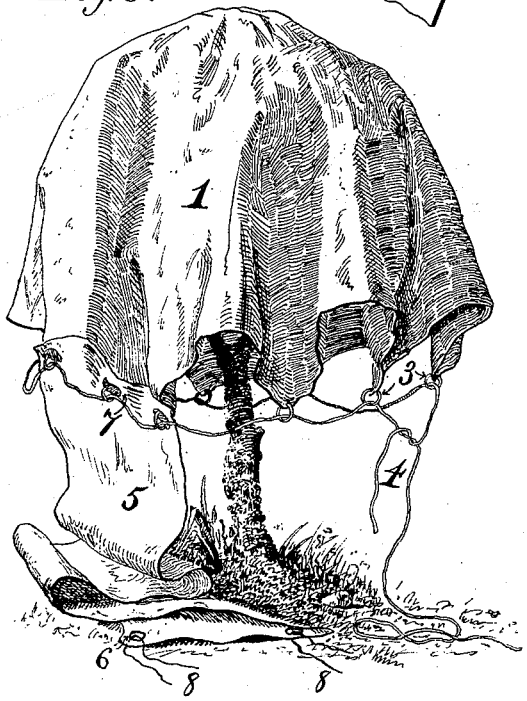
Figure 2:
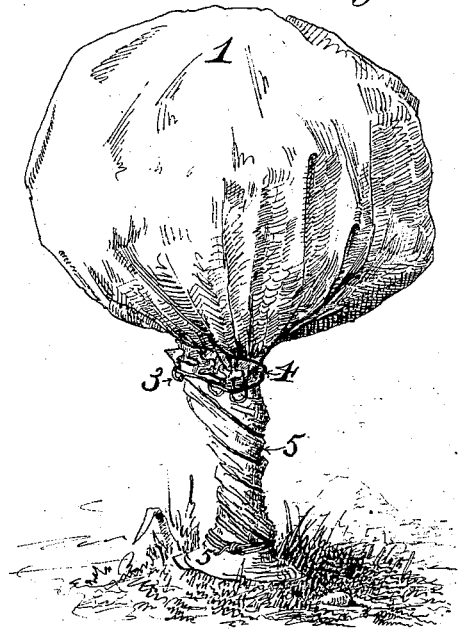

In the accompanying drawings, Figure 1 is an under or inside view of my octagon-shaped cover with loops and drop-sheet. Fig. 2 is a view of the cover thrown over a tree, with its corners drawn around the tree below the branches and the drop-sheet wrapped around the trunk thereof. Fig. 3 is a view of my cover thrown over the branches of a tree, with the drop-sheet hanging loose.

My invention is described as follows: The cover 1 I make square, or it may be octagonal or poke-shaped. The cover is provided with loop-holes 2 in its corners or around its edges, and loops 3, which are secured in said loop-holes, through which loops passes the cord 4, to draw the cover closely around the trunk of the tree. The cover 1 may be made to suit any size tree or bush. I attach to the cover 1 a drop-sheet, 5, which is designed to be wound around the trunk of the tree to protect it from cold and insects. This drop-sheet 5 has loop-holes 6 through its lower corners, through which the cords 8 pass to secure its lower end to the trunk of the tree. It is also provided with loop-holes 7 in its upper end, and is attached to the cover 1 by passing two or more of the loops 3 through the said loop-holes, and then passing the cord 4 through the said loops on the under or inner side of the said drop-sheet, or on the upper or outer side, as shown in Fig. 3. By this means said drop-sheet can be easily and quickly attached to or detached from the said cover. This cover and drop-sheet are made water-proof by any of the best and cheapest means known to the art. The cord 4 and loops 3 may also be treated in the same manner for durability, or the loops may be made of wire or other metal, and may be in design open links.

In cold weather the cover is to be thrown over the tree and bound around the same below the branches, and the drop-sheet is to be bound around the trunk of the tree. In mild weather the cover may be allowed to hang loose, as shown in Fig. 3, and the drop-sheet removed.

I admit that heretofore trees have been protected by covers stretched over their branches, with their edges gathered around the trunk of the tree and bound by a cord, and that the trunks of trees have been protected in various ways, and I therefore do not broadly claim the principle; but What I do claim as new, and desire to secure by Letters Patent, is—

The herein-described water-proof fruit-tree and plant cover, the cover having the loop-holes 2 near its edge, loops 3 secured in said loop-holes, drop-sheet 5, having loop-holes in its upper end, and secured to said cover by part of said loops 3 passing through said loop-holes and cord 4 passing loosely through said loops, substantially as shown and described.

In testimony whereof I affix my signature in presence of two witnesses.

JACOB WALTER CROW.

Witnesses:
E. M. HALL,
G. W. CARDER.